US009245109B2

(12) United States Patent
Kim et al.

(10) Patent No.: US 9,245,109 B2
(45) Date of Patent: Jan. 26, 2016

(54) METHOD AND APPARATUS FOR DETECTING TAMPERED APPLICATION

(71) Applicant: Samsung Electronics Co. Ltd., Suwon-si, Gyeonggi-do (KR)

(72) Inventors: Bumhan Kim, Seoul (KR); Sunghoon Yoo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 16 days.

(21) Appl. No.: 13/767,294

(22) Filed: Feb. 14, 2013

(65) Prior Publication Data

US 2013/0227688 A1  Aug. 29, 2013

(30) Foreign Application Priority Data

Feb. 24, 2012  (KR) .......................... 10-2012-0019115

(51) Int. Cl.
  G06F 21/51  (2013.01)
  G06F 21/64  (2013.01)

(52) U.S. Cl.
  CPC ............... *G06F 21/51* (2013.01); *G06F 21/64* (2013.01)

(58) Field of Classification Search
  CPC .................................. G06F 21/51; F06F 21/64
  See application file for complete search history.

(56) References Cited

U.S. PATENT DOCUMENTS

| | | | |
|---|---|---|---|
| 7,552,342 B1 * | 6/2009 | Rennie | 713/188 |
| 7,707,638 B2 * | 4/2010 | Dellow | 726/26 |
| 7,841,010 B2 * | 11/2010 | Lerouge et al. | 726/26 |
| 7,869,793 B2 * | 1/2011 | Ahn et al. | 455/411 |
| 8,549,631 B2 * | 10/2013 | Lee et al. | 726/22 |
| 8,671,459 B2 * | 3/2014 | Nooning, III | 726/29 |
| 8,818,897 B1 * | 8/2014 | Slodki et al. | 705/51 |
| 2003/0182571 A1 * | 9/2003 | Hashimoto et al. | 713/194 |
| 2003/0191942 A1 * | 10/2003 | Sinha et al. | 713/181 |
| 2004/0221169 A1 * | 11/2004 | Lee et al. | 713/193 |
| 2006/0015748 A1 * | 1/2006 | Goto et al. | 713/190 |
| 2007/0234343 A1 * | 10/2007 | Gouge et al. | 717/174 |
| 2008/0235802 A1 * | 9/2008 | Venkatesan et al. | 726/26 |
| 2010/0325426 A1 * | 12/2010 | Dixon | 713/156 |
| 2011/0321139 A1 * | 12/2011 | Jayaraman et al. | 726/4 |
| 2012/0090025 A1 * | 4/2012 | Milner et al. | 726/22 |
| 2012/0246487 A1 * | 9/2012 | Gu | G06F 21/51 713/90 |
| 2012/0272072 A1 * | 10/2012 | Lee | G06F 21/125 713/190 |
| 2013/0191918 A1 * | 7/2013 | Nachenberg | H04W 12/12 726/24 |
| 2014/0259166 A1 * | 9/2014 | Ghaskadvi et al. | 726/23 |

OTHER PUBLICATIONS

Bian, Gaowei; Nakayama, Ken; Kobayashi, Yoshitake; Maekawa, Mamoru; "Mobile Code Security by Java Bytecode Dependence Analysis", IEEE International Symposium on Communications and Information Technology, Oct. 26-29, 2004, vol. 2, pp. 923-926.*

* cited by examiner

*Primary Examiner* — Victor Lesniewski
(74) *Attorney, Agent, or Firm* — Jefferson IP Law, LLP

(57) ABSTRACT

A method and an apparatus for detecting a tampered application are provided. The method of detecting a tampered application includes acquiring a package of an application, extracting and installing a first execution code from the acquired package of the application, extracting a second execution code from the package of the application when an execution command of the application is received after the first execution code is installed, and performing a preset operation when the second execution code differs from the first execution code.

19 Claims, 6 Drawing Sheets

METHOD AND APPARATUS FOR DETECTING TAMPERED APPLICATION

PRIORITY

This application claims the benefit under 35 U.S.C. §119 (a) of a Korean patent application filed on Feb. 24, 2012 in the Korean Intellectual Property Office and assigned Serial No. 10-2012-0019115, the entire disclosure of which is hereby incorporated by reference.

BACKGROUND OF THE INVENTION

1. Field of the Invention

The present invention relates to a method and an apparatus for detecting a tampered application. More particularly, the present invention relates to a method for detecting a tampered application after installation of an application, and an apparatus thereof.

2. Description of the Related Art

In recent years, as a smart phone is supplied, use of various types of applications have actively increased in the smart phone. The application may be installed by a user or a device provider in a terminal such as a smart phone. The installed application may be executed according to an execution command of a user or other environments after this.

FIG. 1 is a diagram illustrating a procedure of installing and executing an application by a terminal using an Android operating system according to the related art.

Referring to FIG. 1, a MediaHub.apk 105 package is installed in step 140. A signature verification module 110 of the Android operating system verifies a signature of the MediaHub.apk 105 package. After the signature is verified, the terminal stores an optimized execution code 115 extracted from a corresponding application package in step 150. In this case, the optimized executed code may be configured by an odex format.

After configuring the optimized executed code by the odex format, a user 120 inputs an execution command with respect to a Media Hub application 125 in step 160. The execution command with respect to a Media Hub application 125 is transferred to a dalvik virtual machine 130 of Android in step 170. The dalvik virtual machine 130 of the Android loads an execution code 115 of an odex format to execute the Media Hub application 125 in step 180. In the foregoing way, the user may install an application and then execute the application.

Applications of the smart phone provide a convenient function to a user. However, a maliciously tampered application may download unwanted information to the smart phone and damage the phone or applications installed on it. An application providing contents such as music, images, or e-book uses Digital Rights Management (DRM) for protecting copyright. The maliciously tampered application may incapacitate a copyright protection function such as DRM.

To prevent execution of a tampered application in the smart phone, when installing the application, an Android operating system performs a signature verification procedure. However, after the application is installed, when the execution code 115 is tampered, there is a problem that detection of the tampered execution code or execution of the tampered execution code cannot be interrupted.

SUMMARY OF THE INVENTION

Aspects of the present invention are to address at least the above-mentioned problems and/or disadvantages and to provide at least the advantages described below. Accordingly, an aspect of the present invention is to provide an apparatus for detecting a tampered application capable of detecting a tampered execution code after an application is installed and suitably processing the tampered execution code, and a method thereof.

In accordance with an aspect of the present invention, a method of detecting a tampered application is provided. The method includes acquiring a package of an application, extracting and installing a first execution code from the acquired package of the application, extracting a second execution code from the package of the application when an execution command of the application is received after the first execution code is installed, and performing a preset operation when the second execution code differs from the first execution code.

In accordance with another aspect of the present invention, an apparatus for detecting a tampered application is provided. The apparatus includes a memory for storing a package of an application, and a controller for extracting and installing a first execution code from the stored package of the application, for extracting a second execution code from the package of the application when an execution command of the application is received after the first execution code is installed, and for performing a preset operation when the second execution code differs from the first execution code.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, an apparatus and a method for detecting a tampered application in a terminal according to an exemplary embodiment of the present invention will be described with reference to the accompanying drawings.

Before a description of the present invention, a pattern of an application tampering attack is described.

Figure 2:
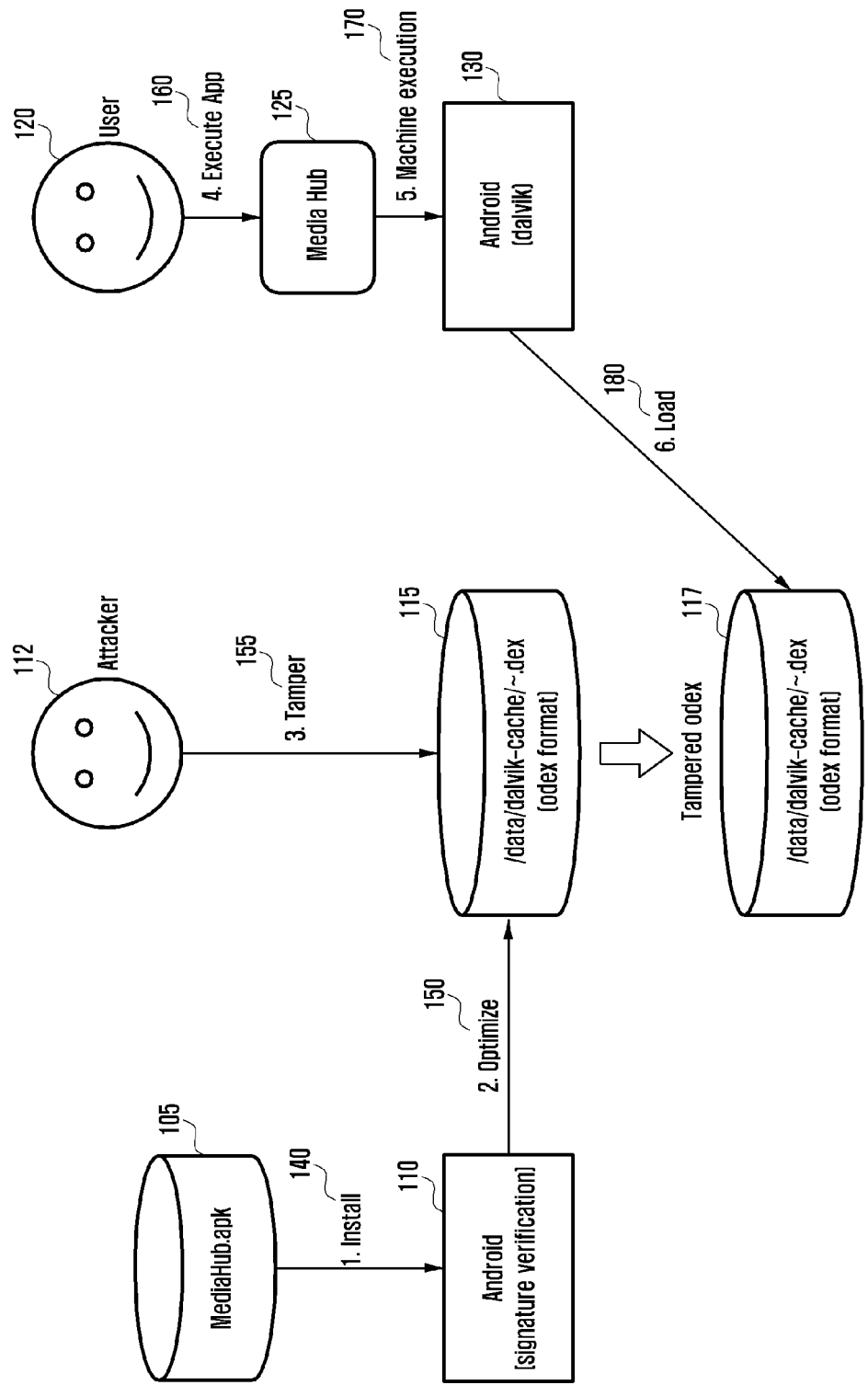
FIG. 2 is a diagram illustrating a tampering attack pattern of an application according to the related art.

FIG. 2 is a diagram illustrating a tampering attack pattern of an application according to the related art.

Figure 1:
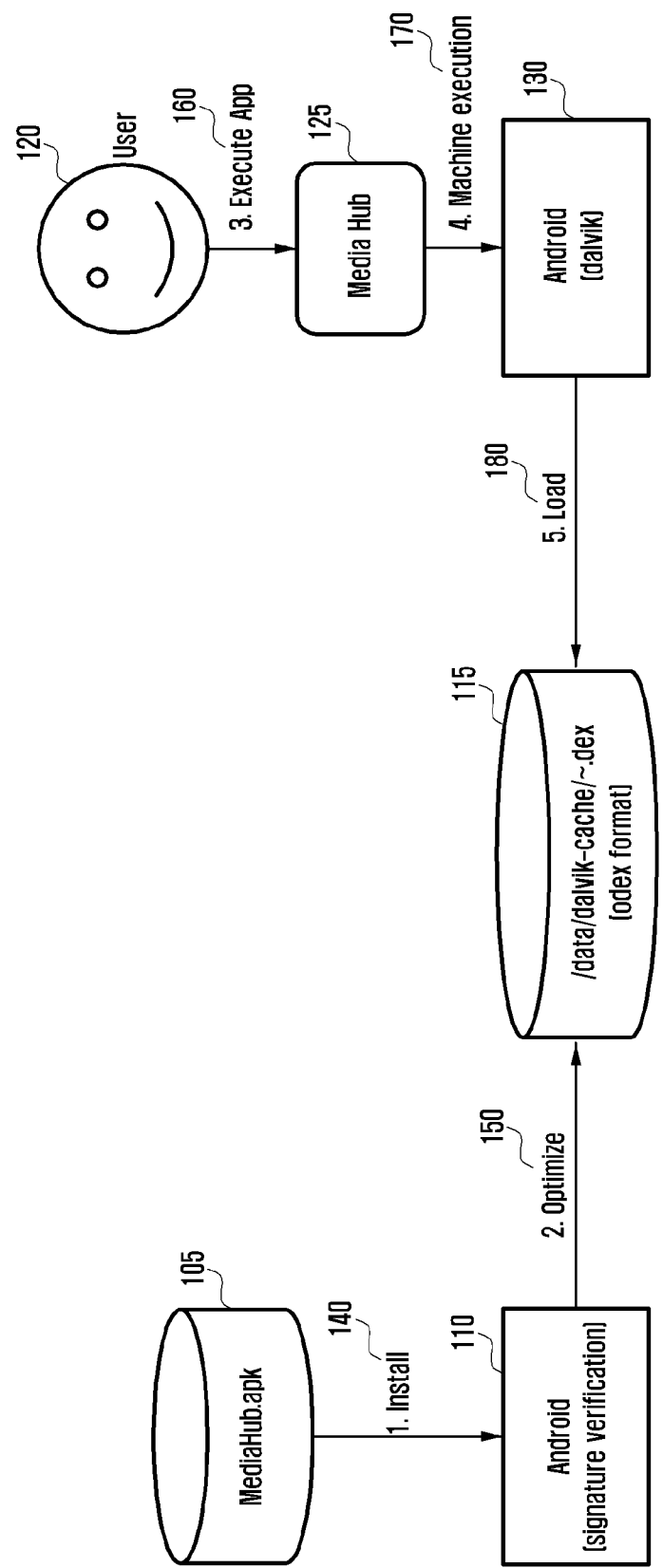
FIG. 1 is a diagram illustrating a procedure of installing and executing an application by a terminal using an Android operating system according to the related art.

Referring to FIG. 2, in the same manner as in FIG. 1, a normal MediaHub.apk package 105 is installed in step 140. When the package 105 is installed, a signature verifying procedure 110 is performed. After performing the signature verification procedure, the terminal extracts an optimized execution code 115 from the package 105 in step 150. Next, an attacker 112 tampers with the installed execution code 115 in step 155. An original execution code 115 is converted into a tampered execution code 117 according to a tampering attack of the attacker 112. Next, the user 120 executes a corresponding application in the media hub 125 in step 160 and a dalvik virtual machine 130 is executed in step 170. The dalvik virtual machine 130 does not detect that an execution code is tampered and loads and executes the tampered execution code 117 as is in step 180.

A method capable of detecting or preventing an attack tampering an execution code after a package is installed is not known in the art.

Figure 3:
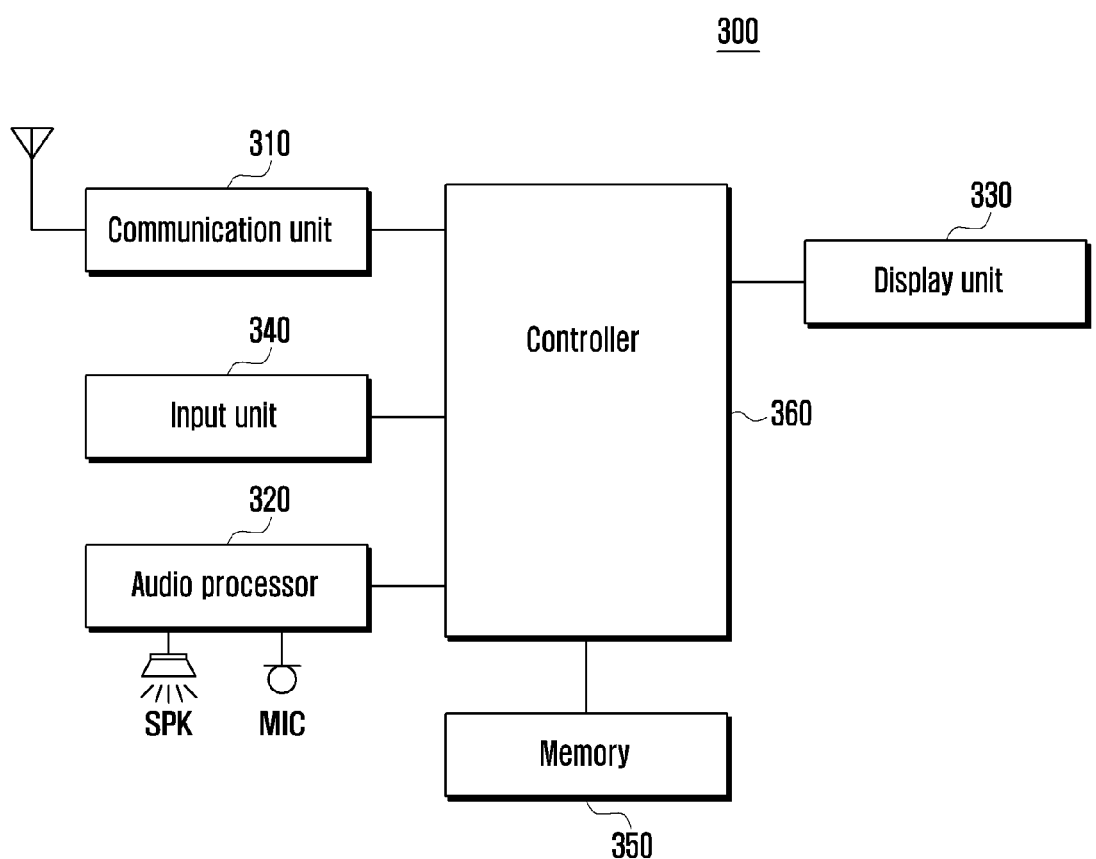
FIG. 3 is a block diagram illustrating an apparatus for detecting a tampered application according to an exemplary embodiment of the present invention.

FIG. 3 is a block diagram illustrating an apparatus 300 for detecting a tampered application according to an exemplary embodiment of the present invention.

Referring to FIG. 3, the apparatus 300 for detecting a tampered application according to an exemplary embodiment of the present invention includes a communication unit 310, an audio processor 320, a display unit 330, an input unit 340, a memory 350, and a controller 360.

The communication unit 310 performs a transceiving function of corresponding data for wired communication or wireless communication of the apparatus 300 for detecting a tampered application. For example, the communication unit 310 may include an RF receiver for up-converting a frequency of a transmitted signal and amplifying the converted signal and an RF receiver for low-noise-amplifying a received signal and down-converting the amplified signal. The communication unit 310 may receive data through a wireless channel and output the received data to the controller 360, and transmit data outputted from the controller 360 through the wireless channel.

More particularly, the communication unit 310 according to an exemplary embodiment of the present invention may transceive an application package file or data necessary for executing an application. If transceiving of image/voice or data is necessary, the communication unit 310 may be modified accordingly.

The audio processor 320 converts a digital audio signal into an analog audio signal through an audio CODEC and plays the analog audio signal through a speaker SPK. The audio processor 320 converts an analog audio signal inputted from the microphone MIC into a digital audio signal through the audio CODEC. The audio processor 320 may be configured by a CODEC. The CODEC may be configured by a data CODEC processing packet data and an audio CODEC processing an audio signal such as a voice. If a separate processing of the audio is not necessary, the audio processor 320 may be omitted.

The display unit 330 visually provides a menu of the apparatus 300 for detecting a tampered application, input data, function setting information and various other information to the user. The display unit 330 performs a function of outputting a booting screen, an idle screen, a menu screen, a call screen, and other application screens of the apparatus 300 for detecting a tampered application. When the apparatus 300 for detecting a tampered application supports an image call, the display unit 330 may display an image received from the other image call party.

The display unit 330 may be configured by a Liquid Crystal Display (LCD), an Organic Light Emitting Diode (OLED), an Active Matrix Organic Light Emitting Diode (AMOLED), and the like.

The input unit 340 receives a control input of a user and transfers the received control input of the user to the controller 360. The input unit 340 may be implemented in the form of a touch sensor and/or a key pad.

The touch sensor detects a touch input of the user. The touch sensor may be configured by a touch sensor of a capacitive overlay, a resistive overlay type, an infrared beam type, a pressure sensor, and the like. In addition to the foregoing sensors, various types of sensor devices capable of detecting contact or pressure of an object may be configured as a touch sensor of the present exemplary embodiment. The touch sensor detects a touch input of the user and generates and transmits a detection signal to the controller 360. The detection signal includes coordinate data which indicates where the user inputted a touch. When the user inputs a touch location moving operation, the touch sensor generates and transmits a detection signal including coordinate data of a touch location moving path.

A key pad receives a key operation of the user for controlling the apparatus 300 for detecting a tampered application, and generates and transfers an input signal to the controller 360. The key pad may include numeric keys and arrow keys, and may be provided as a predetermined function key on a side of the apparatus 300 for detecting a tampered application.

The input unit 340 may include only a touch sensor or only a key pad. When a separate control input is unnecessary, the input unit 340 may be omitted.

The memory 350 stores programs and data necessary for an operation of the portable terminal 100. The memory 350 may be divided into a program area and a data area. The program area may store a program controlling an overall operation of the apparatus 300 for detecting a tampered application, an operating system OS for booting the apparatus 300 for detecting a tampered application, an application program necessary for playing multi-media contents, and an application program necessary for other option functions of the apparatus 300 for detecting a tampered application, for example, a camera function, a voice playback function, an image or moving image playback function and the like. The data area is an area for storing data generated according to use of the apparatus 300 for detecting a tampered application, and may store images, moving images, phone-book, audio data, and the like. In particular, the memory 350 may store a package file of an application and an optimized execution code.

The controller 360 controls an overall operation of respective constituent elements of the apparatus 300 for detecting a tampered application.

Figure 4:
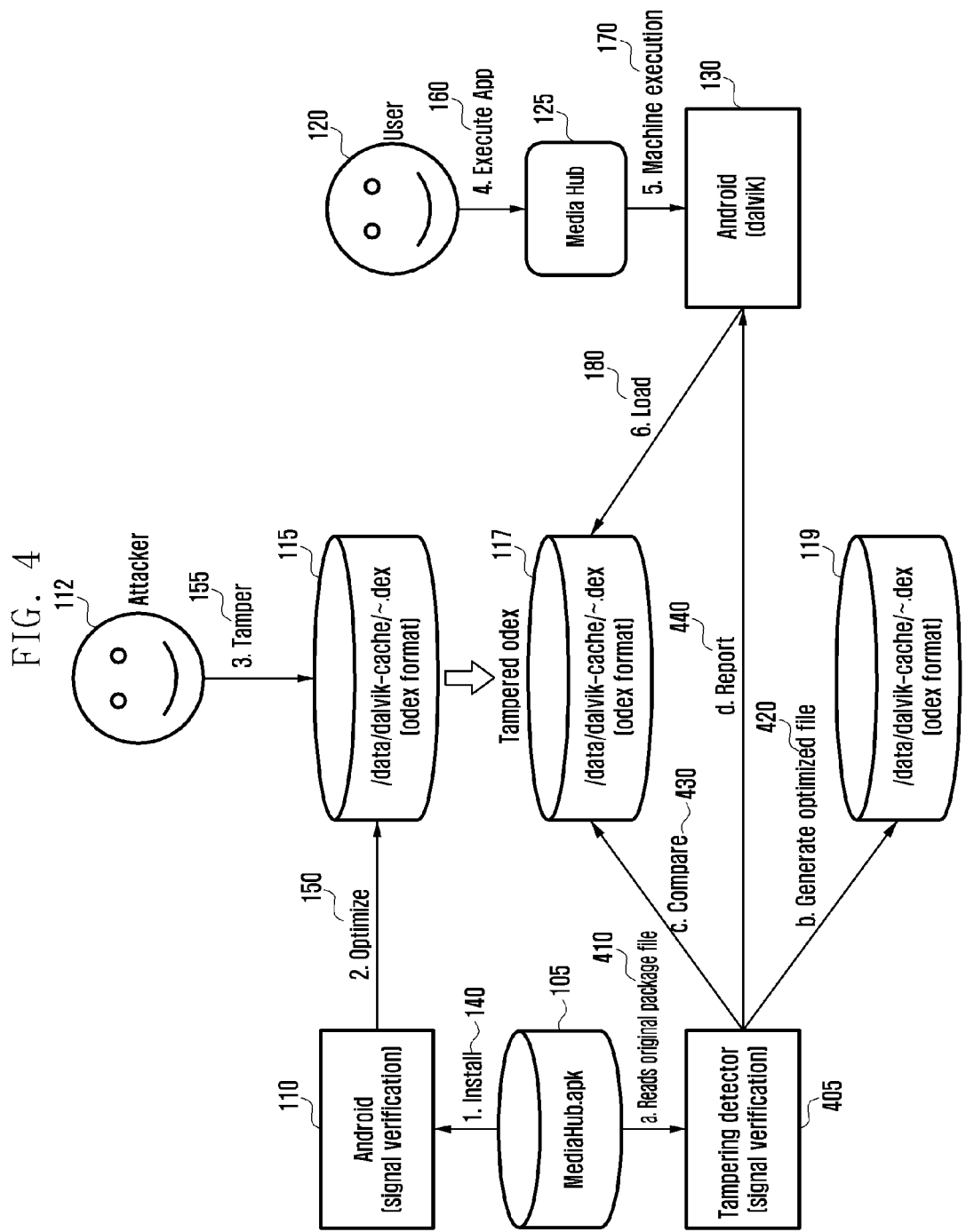
FIG. 4 is a diagram illustrating a procedure of detecting a tampered application in a terminal according to an exemplary embodiment of the present invention.
Figure 5:
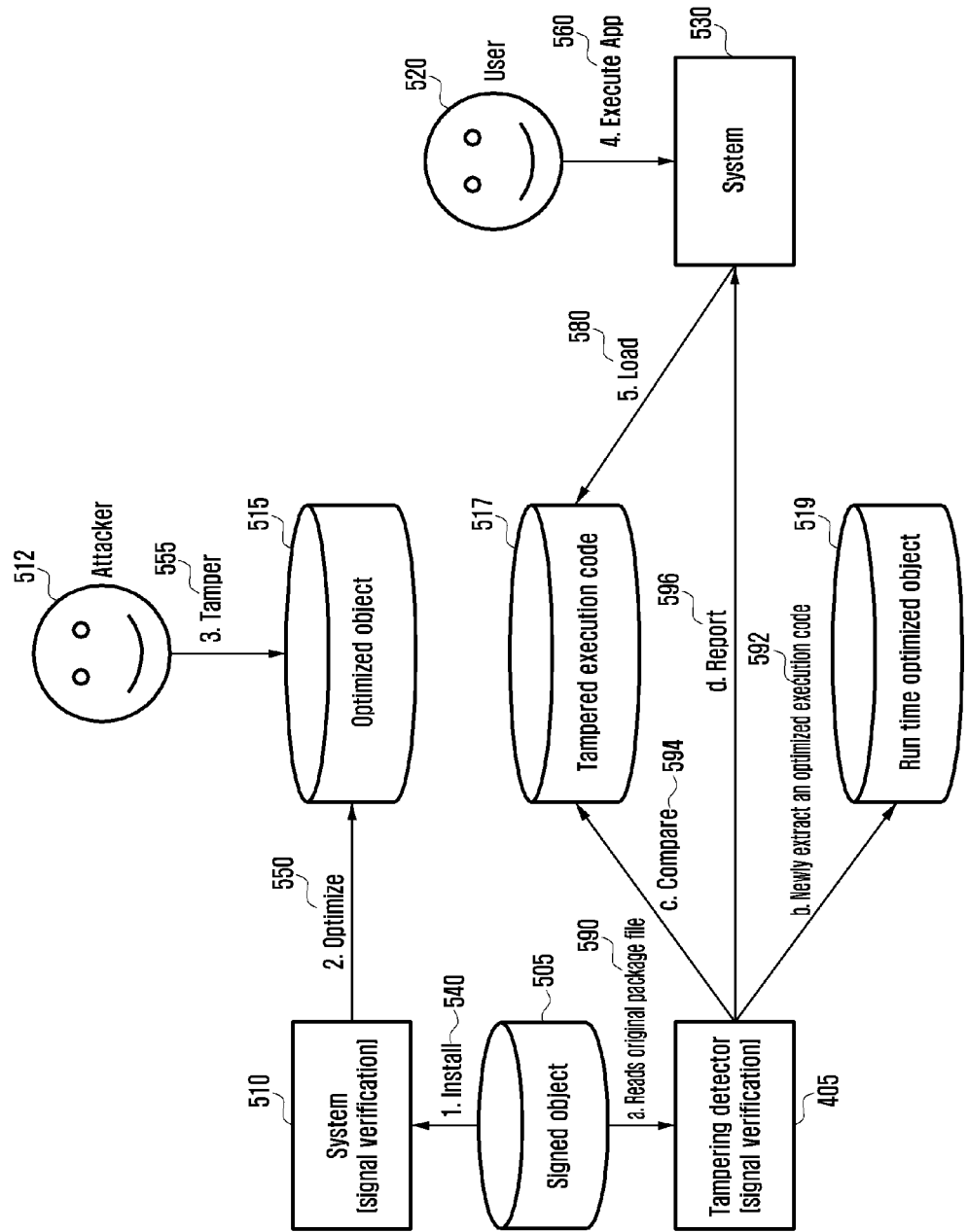
FIG. 5 is a diagram illustrating a procedure of detecting a tampered application in a terminal according to another exemplary embodiment of the present invention.
Figure 6:
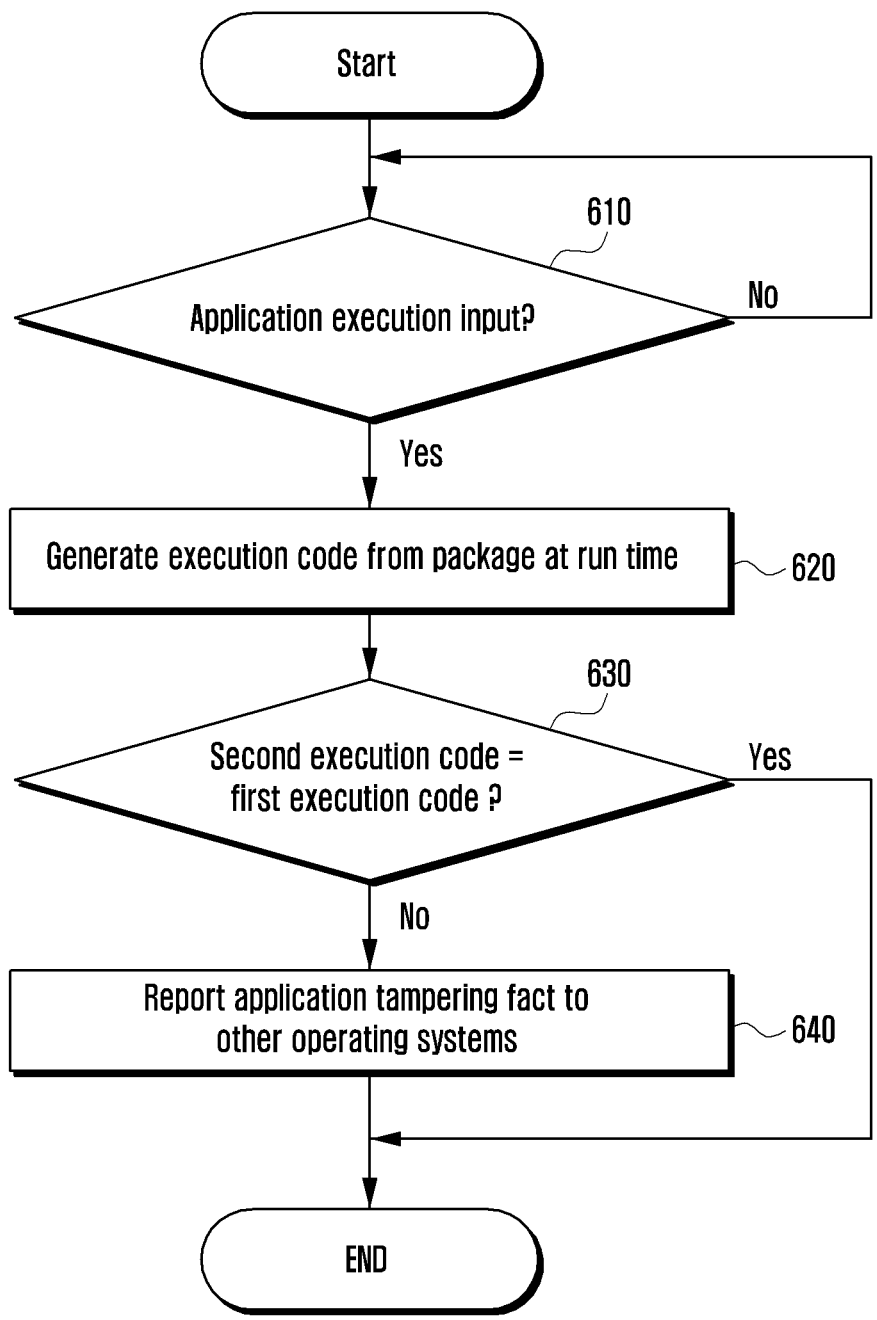
FIG. 6 is a flowchart illustrating a method of detecting a tampered application in a terminal according to an exemplary embodiment of the present invention.

More particularly, when receiving an application execution command as illustrated in FIGS. 4 to 6, the controller 360 may extract an execution code from a package file of a corresponding application and compare the extracted execution code with an original execution code stored in the memory 350. When an execution code again extracted from the package file differs from the original execution code stored in the memory 350 in the comparison result, the controller 360 may perform a suitable operation of blocking an execution of a corresponding application or recording or storing information indicating that the application is tampered. A detail description of the controller 360 will be given with reference to FIGS. 4 to 6.

FIG. 4 is a diagram illustrating a procedure of detecting a tampered application in a terminal according to an exemplary embodiment of the present invention.

First, a MediaHub.apk package 105 is installed in step 140. A signature verification module 110 of an Android operating system verifies a signature of the MediaHub.apk package 105. After verifying the signature, a terminal stores an optimized execution code 115 extracted from a corresponding application package in step 150. In this case, the optimized execution code may be configured by an odex format. After the execution code 115 is stored, the attacker 112 tampers with the execution code 115 to generate a tampered execution code 117 in step 155.

After generating the tampered execution code 117 in step 115, the user 120 inputs an execution command with respect to a Media Hub application 125 in step 160. The execution command with respect to a Media Hub application 125 is transferred to a dalvik virtual machine 130 of Android in step 170. The dalvik virtual machine 130 of Android loads an execution code 117 of an odex format to execute a Media Hub application 125 in step 180.

However, according to an exemplary embodiment of the present invention, when an execution command of a Media Hub application 125 is inputted, a tampering detector 405 reads an original package file from the MediaHub.apk package 105 to verify a signature in step 410. In this case, if the signature is invalid, since the package file 105 is invalid, an execution of the application may stop. When the signature is valid, the tampering detector 405 newly extracts an execution code 119 from the MediaHub.apk package 105 in step 420. Next, the tampering detector 405 compares a newly generated execution code 119 with the tampered execution code 117 in step 430. In this case, since the execution code is tampered, the tampering detector 450 may report, at step 440, that an execution code of a corresponding application is tampered to an Android operating system.

According to another exemplary embodiment of the present invention, when detecting tampering of the execution code, the tampering detector 405 may prevent execution of the corresponding application or store information indicating that the corresponding application is tampered. The stored information may help to prove a cause of a problem of the terminal afterwards. When the tampering detector 405 detects tampering of the execution code, a lower function for executing a corresponding application may be restricted. For example, when the tampering detector 405 detects that a moving image playback application is tampered, a function of a CODEC module necessary for executing the application may be restricted. Through this, execution of a corresponding tampered application may be substantially prevented.

According to this exemplary embodiment of the present invention, as a result determined by the tampering detector 405, when the newly extracted execution code is the same as an originally stored execution code, the tampering detector 405 needs not to perform a separate operation and the Media Hub application 125 may be performed without problem.

In the exemplary embodiment of FIG. 4, the user 120 may differ from or may be the attacker 112. That is, because it is difficult for persons other than the user 120 to approach a corresponding terminal, the user 120 generally and intentionally tampers with an execution code of an application.

As described above, when the apparatus 300 for detecting the tampered application detects tampering of an execution code of the application, the apparatus stops execution of the tampered execution code or limits a lower function, thereby preventing a problem with the terminal and preventing the user from executing an application by bypassing a restricting function regarding copyright and other restrictions. According to another exemplary embodiment of the present invention, when the apparatus 300 for detecting a tampered application detects tampering of an execution code of an application and stores corresponding information, the stored information may help to prove a cause of a problem occurring in a terminal afterwards.

FIG. 5 is a diagram illustrating a procedure of detecting a tampered application in a terminal according to another exemplary embodiment of the present invention. A case illustrated in FIG. 4 is limited to the Android operating system but the exemplary embodiments of the present invention are applicable to a general case as illustrated in FIG. 5.

First, a signed object (application) package 505 is installed in step 540. A signature verification module 510 of a system verifies a signature of a corresponding object package 505. After the signature is verified, the terminal stores an optimized execution code (object) 515 extracted from a corresponding application package in step 550. After the execution code 515 is stored, the attacker 512 tampers with the execution code 515 to generate a tampered execution code (object) 517 in step 555.

After generating the tampered execution code, the user 520 inputs an execution command of the installed application in step 560. The execution command of the application is transferred to an operating system 530. The operating system 530 loads the execution code 117 so as to execute a corresponding application in step 580.

However, according to this exemplary embodiment of the present invention, if an execution command with respect to the application is inputted, the tampering detector 405 reads an original package file (signed object) 505 of a corresponding application to verify a signature in step 590. In this case, when the signature is invalid, since the package file 505 is also invalid, an execution of the application may stop. When the signature is valid, the tampering detector 405 newly extracts an optimized execution code (object) 519 from an original package 505 in step 592. Next, the tampering detector 405 compares the newly generated execution code 519 with the tampered execution code 517 in step 594. Since the execution code is tampered in this case, the tampering detector 405 may report that an execution code of a corresponding application is tampered to the system 530 in step 596.

According to another exemplary embodiment of the present invention, if the tampering detector 405 detects tampering of the execution code, it may stop execution of a corresponding application or store information indicating that a corresponding application is tampered. The stored information may help to prove a cause of a problem of the terminal afterwards. If detecting tampering of an execution code, the tampering detector 405 may restrict a lower function for executing a corresponding application. For instance, when detecting that a moving image playback application is tampered, the tampering detector 405 may restrict a function of a CODEC module necessary for executing the application. Through this, an execution of a substantially tampered application may be prevented.

According to this exemplary embodiment of the present invention, as a result determined by the tampering detector 405, if the newly extracted execution code is identical with an originally stored execution code, the tampering detector 405 needs not to perform a separate operation and the application may be performed without problem.

In the exemplary embodiment of FIG. 5, the user 520 may be different from or identical to the attacker 512. That is, because it is difficult for persons other than the user 520 to approach a corresponding terminal, the user 520 generally and intentionally tampers an execution code of an application.

As described above, when the apparatus 300 for detecting the tampered application detects tampering of an execution code of the application to stop execution of the tampered execution code or to limit a lower function, a problem of the terminal is previously prevented and the user may prevent execution of an application by bypassing a restricting function of copyright and other restrictions. According to another exemplary embodiment of the present invention, when the apparatus 300 for detecting a tampered application detects tampering of an execution code of an application and stores information indicating that a corresponding application is tampered, the stored information may help to prove a cause of a problem occurring in a terminal afterwards.

FIG. 6 is a flowchart illustrating a method of detecting a tampered application in a terminal according to an exemplary embodiment of the present invention.

Before performing step 610, it is assumed that an application package is downloaded or is acquired in another scheme and then installed. In this case, the first execution code is stored.

A controller 360 determines whether an application execution input is received in step 610. If the application execution input is not received, the controller 360 repeats step 610 until the application execution input is received. When the application execution input is received, the process goes to step 620. The controller 360 extracts a second execution code from a package in a run time, namely, after the application execution input is received in step 620. In this case, verification of the signature may be also performed. The controller 360 determines whether a second execution code is identical with a first execution code stored when installing the package in step 630. When the second execution code differs from the first execution code, the controller 360 may report an application tampering fact to other operating systems in step 640. When the second execution code is identical with the first execution code, an application is executed according to a scheme of the related art without performing a separate specific procedure.

When a signature of the application is invalid or a newly extracted execution code differs from an execution code of an application stored before an execution input, the controller 360 performs a preset operation. An operation of the controller 360 when the signage of the application is invalid may be set to be identical with or different from an operation of the controller 360 when the newly extracted execution code differs from the execution code of an application stored before the execution input.

When the signature of the application is invalid, because an application operation due to tampering may be actually difficult, an execution of the application may stop. According to another exemplary embodiment of the present invention, when the signature of the application is invalid, the controller 360 may store information indicating that a signature of a corresponding application is invalid.

When the newly extracted execution code differs from the execution code of an application stored before the execution input according to execution input, the controller 360 determines that an execution code of the application is tampered. In this case, the controller 360 may store information indicating that an execution code of a corresponding application is tampered or report that an execution code of a corresponding application is tampered to other operating systems. According to another exemplary embodiment of the present invention, the controller 360 may prevent an execution of a corresponding application or prevent provision of a detailed function necessary to execute the corresponding application. For instance, when a moving image playback application is tampered, the controller 360 may prevent provision of a moving image CODEC function.

As described above, a case where an execution code is tampered after installation of the application by newly extracting and comparing an application execution code in a run time may be easily detected. When the application execution code is tampered, information indicating that an execution of the application is prevented or the application is tampered is stored so that a bad effect due to a tampered application execution code may be prevented or reduced.

An exemplary embodiment of the present invention may provide an apparatus and a method for detecting a tampered application which may detect and suitably process tampering of an execution code after installation of the application.

Since computer program instructions may be mounted in a processor of a universal computer, a special computer or other programmable data processing equipment, instructions performed through a processor of a computer or other programmable data processing equipment generates instructions for performing functions described in block(s) of the flowcharts. Since the computer program instructions may be stored in a computer available or computer readable memory capable of orienting a computer or other programmable data processing equipment to implement functions in a specific scheme, instructions stored in the computer available or computer readable memory may produce manufacturing articles involving the instructions executing the functions described in the block(s) of the flowcharts. Because the computer program instructions may be mounted on a computer or other programmable data processing equipment, a series of operation steps are performed in the computer or other programmable data processing equipment to create a process executed by the computer such that instructions performing the computer or other programmable data processing equipment may provide steps for executing functions described in the block(s) of the flowcharts.

Further, each block may indicate a part of a module, a segment, or a code including at least one executable instruction for executing specific logical function(s). It should be noticed that several execution examples may generate functions described in blocks and may be out of an order. For example, two continuously shown blocks may be simultaneously performed, and the blocks may be performed in a converse order according to corresponding functions.

As used in the exemplary embodiments of the present invention, the term "~unit" refers to software or a hardware structural element such as FPGA or ASIC, and the term "~unit" performs some roles. However, the "~unit" is not limited to software or hardware. The term "~unit" can be configured to be stored in an addressable storage medium and to play at least one process. Accordingly, for example, the term "~unit" includes software structural elements, object-oriented software structural elements, class structural elements, task structural elements, processes, functions, attributes, procedures, subroutines, segments of a program code, drivers, firmware, microcode, circuit, data, database, data structures, tables, arrays, and variables. Functions provided in structural elements and the "~units" may be engaged by the smaller number of structural elements and the "~units", may be divided by additional structural elements. Furthermore, the structural elements and the "~units" may be implemented to play a device or at least one CPU in a security multimedia card.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of detecting a tampered application in an apparatus including a communication unit and a hardware controller, the method comprising:
   downloading, by the communication unit, an original package of an application, wherein the original package of the downloaded application is a package archive file comprising an execution code to be executed by at least one of a processor or a virtual machine;
   extracting and installing, by the hardware controller, the execution code from the downloaded original package of the application;
   re-extracting, by the hardware controller, the execution code from the original package of the application when an execution command of the application is received after the extracted execution code is installed; and
   comparing, by the hardware controller, the installed execution code with the re-extracted execution code for determining whether or not the installed execution code is tampered.

2. The method of claim 1, further comprising, before the re-extracting of the execution code from the original package:
   when the execution command of the application is received after the extracted execution code is installed, verifying a signature of the package of the application; and
   when the signature of the package of the application is invalid, storing information indicating that the application is tampered.

3. The method of claim 1, further comprising:
   storing information indicating that the installed execution code is tampered when the installed execution code differs from the re-extracted execution code.

4. The method of claim 1, further comprising:
   stopping execution of the application when the installed execution code differs from the re-extracted execution code.

5. The method of claim 1, further comprising:
   stopping providing a function to the application which the application uses to execute the application when the installed execution code differs from the re-extracted execution code.

6. The method of claim 1, further comprising:
   reporting that the installed execution code is tampered to an operating system when the installed execution code differs from the re-extracted execution code.

7. The method of claim 1, wherein extracting and installing the execution code includes optimizing the execution code.

8. An apparatus for detecting a tampered application, the apparatus comprising:
   a memory configured to store an original package of a downloaded application, wherein the original package of the downloaded application is a package archive file comprising an execution code to be executed by at least one of a processor or a virtual machine; and
   a controller configured to extract and install the execution code from the stored original package of the downloaded application, to re-extract an execution code from the original package of the downloaded application when an execution command of the downloaded application is received after the extracted execution code is installed, to perform a preset operation when the re-extracted execution code differs from the installed execution code, and to compare the installed execution code with the re-extracted execution code to determine whether or not the installed execution code is tampered.

9. The apparatus of claim 8, wherein before the re-extracting of the execution code from the original package of the downloaded application, the controller is further configured to verify a signature of the package of the downloaded application when the execution command of the downloaded application is received after the extracted execution code is installed; and
   to store information indicating that the downloaded application is tampered when the signature of the package of the downloaded application is invalid.

10. The apparatus of claim 8, further comprising storing information indicating that the installed execution code is tampered when the installed execution code differs from the re-extracted execution code.

11. The apparatus of claim 8, wherein the controller is further configured to stop execution of the downloaded application when the installed execution code differs from the re-extracted execution code.

12. The apparatus of claim 8, wherein the controller is further configured to stop providing a function to the downloaded application which the downloaded application uses to execute the downloaded application when the installed execution code differs from the re-extracted execution code.

13. The apparatus of claim 8, wherein the controller is further configured to report that the installed execution code is tampered to an operating system when the installed execution code differs from the re-extracted execution code.

14. The apparatus of claim 8, wherein extracting and installing the execution code includes optimizing the execution code.

15. A method of detecting a tampered application in an apparatus including a communication unit and a hardware controller, the method comprising:
   downloading, by the communication unit, an application;
   extracting and installing, by the hardware controller, compiled execution code from the downloaded application;
   re-extracting the compiled execution code from the downloaded application, by the hardware controller, when an execution command of the downloaded application is received after the extracted compiled execution code is installed; and determining, by the hardware controller, whether the re-extracted compiled execution code is identical to the installed compiled execution code, wherein when it is determined that the re-extracted compiled execution code differs from the installed compiled execution code, determining, by the hardware controller, that the application is tampered, and when it is determined that the re-extracted compiled execution code is identical to the installed compiled execution code, executing, by the hardware controller, the application.

16. The method of claim 15, further comprising:

storing information indicating that the installed compiled execution code is tampered when the installed compiled execution code differs from the re-extracted compiled execution code.

17. The method of claim 15, further comprising:

stopping execution of the application when the installed compiled execution code differs from the re-extracted compiled execution code.

18. The method of claim 15, further comprising:

preventing execution of a function for executing the downloaded application when the installed compiled execution code differs from the re-extracted compiled execution code.

19. The method of claim 15, wherein extracting and installing the compiled execution code includes optimizing the compiled execution code.

* * * * *